United States Patent
Lin et al.

(10) Patent No.: US 8,867,201 B2
(45) Date of Patent: Oct. 21, 2014

(54) COMPOSITE STYLUS RETAINING STRUCTURE IN ELECTRONIC DEVICE

(75) Inventors: Ming-Ju Lin, Taichung (TW); Shui-Hsu Chen, Changhua County (TW); Chen-Chung Yang, Taichung (TW); Chia-Sheng Liu, Taichung (TW); Jih-Sheng Li, Changhua County (TW); Shih-Yen Chen, Nantou County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 289 days.

(21) Appl. No.: 13/447,359

(22) Filed: Apr. 16, 2012

(65) Prior Publication Data

US 2013/0003277 A1 Jan. 3, 2013

(30) Foreign Application Priority Data

Jun. 30, 2011 (CN) .......................... 2011 1 0182817

(51) Int. Cl.
| | |
|---|---|
| G06F 1/16 | (2006.01) |
| H04M 1/725 | (2006.01) |
| H04M 1/21 | (2006.01) |

(52) U.S. Cl.
CPC ......... *G06F 1/1656* (2013.01); *H04M 1/72519* (2013.01); *H04M 1/21* (2013.01); *G06F 2200/1632* (2013.01)
USPC .................................................. 361/679.04

(58) Field of Classification Search
USPC .................................................. 361/679.4
See application file for complete search history.

(56) References Cited

U.S. PATENT DOCUMENTS

| | | | | |
|---|---|---|---|---|
| 5,375,076 A | * | 12/1994 | Goodrich et al. | ........ 361/679.17 |
| 5,506,749 A | * | 4/1996 | Matsuda | ................... 361/679.58 |
| 5,574,625 A | * | 11/1996 | Ohgami et al. | .......... 361/679.09 |
| 5,949,408 A | * | 9/1999 | Kang et al. | ..................... 345/169 |
| 5,996,956 A | * | 12/1999 | Shawver | ..................... 248/309.1 |
| 6,005,767 A | * | 12/1999 | Ku et al. | ................... 361/679.27 |
| 6,229,695 B1 | * | 5/2001 | Moon | ......................... 361/679.3 |
| 6,239,968 B1 | * | 5/2001 | Kim et al. | ................ 361/679.56 |
| 6,266,240 B1 | * | 7/2001 | Urban et al. | ............. 361/679.56 |
| 6,295,198 B1 | * | 9/2001 | Loh et al. | .................... 361/679.3 |
| 6,356,442 B1 | * | 3/2002 | Lunsford | ................ 361/679.56 |
| 6,356,443 B2 | * | 3/2002 | Jenks et al. | .............. 361/679.56 |
| 6,388,870 B1 | * | 5/2002 | Canova et al. | .......... 361/679.44 |
| 6,388,877 B1 | * | 5/2002 | Canova et al. | .......... 361/679.56 |
| 6,442,637 B1 | * | 8/2002 | Hawkins et al. | .............. 710/300 |
| 6,445,577 B1 | * | 9/2002 | Madsen et al. | ............. 361/679.3 |
| 6,507,336 B1 | * | 1/2003 | Lunsford | ...................... 345/168 |
| 6,525,928 B1 | * | 2/2003 | Madsen et al. | .......... 361/679.56 |
| 6,532,152 B1 | * | 3/2003 | White et al. | ................... 361/692 |
| 6,594,142 B2 | * | 7/2003 | Katz | ........................ 361/679.16 |
| 6,636,204 B2 | * | 10/2003 | Santoh | .......................... 345/179 |
| 6,646,864 B2 | * | 11/2003 | Richardson | ................ 361/679.3 |

(Continued)

*Primary Examiner* — Lisa Lea Edmonds
(74) *Attorney, Agent, or Firm* — WPAT, PC; Justin King

(57) ABSTRACT

A composite stylus retaining structure for an electronic device is provided. The composite stylus retaining structure includes a stylus and a housing. The stylus includes a body, a head and a connecting rod. The housing includes a first wall and a second wall connected to each other, and a first receiving groove and a second receiving groove are formed at an intersection of the first wall and the second wall. The first receiving groove is used to receive the head. A retaining member is disposed in the first receiving groove to retain the stylus. The second receiving groove is used to receive the head of the stylus.

19 Claims, 6 Drawing Sheets

(56) References Cited

U.S. PATENT DOCUMENTS

| | | | |
|---|---|---|---|
| 6,788,532 B2 * | 9/2004 | Yang et al. | 361/679.33 |
| 6,819,557 B2 * | 11/2004 | Lilenfeld | 361/679.56 |
| 6,865,076 B2 * | 3/2005 | Lunsford | 361/679.56 |
| 7,113,397 B2 * | 9/2006 | Lee | 361/679.06 |
| 7,181,256 B2 * | 2/2007 | Hyun et al. | 455/575.3 |
| 7,362,563 B2 * | 4/2008 | Love | 361/679.01 |
| 7,425,948 B2 * | 9/2008 | Ling et al. | 345/179 |
| 7,474,525 B2 * | 1/2009 | Watanabe et al. | 361/679.28 |
| 7,796,382 B1 * | 9/2010 | Li | 361/679.58 |
| 8,054,613 B2 * | 11/2011 | Hsu et al. | 361/679.01 |
| 8,194,055 B2 * | 6/2012 | Liu et al. | 345/179 |
| 8,203,543 B2 * | 6/2012 | Chen et al. | 345/179 |
| 8,217,919 B2 * | 7/2012 | Wang | 345/179 |
| 8,390,601 B2 * | 3/2013 | Liang | 345/179 |
| 8,462,488 B2 * | 6/2013 | Tseng | 361/679.01 |
| 8,692,813 B2 * | 4/2014 | Yeh | 345/179 |
| 2003/0184529 A1 * | 10/2003 | Chien et al. | 345/179 |
| 2005/0168500 A1 * | 8/2005 | Lee | 345/905 |
| 2006/0133015 A1 * | 6/2006 | Lin et al. | 361/681 |
| 2007/0279859 A1 * | 12/2007 | Canova et al. | 361/683 |
| 2009/0237377 A1 * | 9/2009 | Lai et al. | 345/179 |
| 2010/0110043 A1 * | 5/2010 | Lu | 345/179 |
| 2010/0252337 A1 * | 10/2010 | Yang | 178/19.01 |
| 2011/0188184 A1 * | 8/2011 | Hsu et al. | 361/679.01 |
| 2011/0285671 A1 * | 11/2011 | Wu et al. | 345/179 |
| 2012/0014043 A1 * | 1/2012 | Dong et al. | 361/679.01 |
| 2012/0140409 A1 * | 6/2012 | Minaguchi et al. | 361/679.55 |
| 2012/0146913 A1 * | 6/2012 | Linn | 345/169 |
| 2012/0154998 A1 * | 6/2012 | Nonomura et al. | 361/679.01 |
| 2013/0070397 A1 * | 3/2013 | Xie | 361/679.01 |

* cited by examiner

US 8,867,201 B2

COMPOSITE STYLUS RETAINING STRUCTURE IN ELECTRONIC DEVICE

TECHNICAL FIELD

The present invention relates generally to an object retaining structure for an electronic device, and more particularly to a composite stylus retaining structure in an electronic device.

BACKGROUND

There are several types of touch modules in touch displays. Some of the touch modules (e.g., electromagnetic induction touch modules) need special styluses for inputting signals and the other ones may use the users' fingers as a stylus. However, to provide more accurate touching and for the convenience of users, a general stylus can also be included in touch electronic devices.

FIG. 1 is a schematic view of a conventional portable electronic device having a stylus. Referring to FIG. 1, in a conventional electronic device 10, a fixing plate 13 for receiving a stylus 11 is disposed on a surface 15 of a housing 12. The fixing plate 13 has a receiving structure 14 for receiving the stylus 11. However, except the housing 12, an additional component, the fixing plate 13, is required during the fabrication of the portable electronic device 10. Furthermore, the receiving structure 14 should be formed in the fixing plate 13 to receive the stylus 11. This design introduces more components and also takes more assembling time to fix the fixing plate 13 on the housing 12. As a result, the assembling efficiency is decreased.

SUMMARY

The present invention provides a composite stylus retaining structure in an electronic device, which is capable of retaining a stylus without an additional fixing plate.

The present disclosure provides a composite stylus retaining structure, in which a housing defines an accommodating space for receiving a stylus. Thus, there is no need to provided additional fixing plate on a surface of the housing to fix the stylus.

In one embodiment, a composite stylus retaining structure includes a housing and a stylus. The stylus includes a body, a head and a connecting rod connected between the body and the head. An outer diameter of the connecting rod is less than that of the head and the body. The housing includes a first wall and a second wall connected to each other, and a first receiving groove and a second receiving groove are formed at an intersection of the first wall and the second wall. The first receiving groove is used to receive the head. A retaining member is disposed in the first receiving groove to retain the stylus. The second receiving groove is used to receive the head.

In one embodiment, a composite stylus retaining structure includes a housing and a stylus. The stylus includes a body, a head and a connecting rod connected between the body and the head. An outer diameter of the connecting rod is less than that of the head and the body. The housing includes a first wall and a second wall connected to each other, and an accommodating space for receiving the stylus is formed in an intersection of the first wall and the second wall. A retaining member is disposed in the accommodating space to retain the stylus.

In the above stylus retaining structures, the first receiving groove and the second receiving groove are formed on the housing, and the retaining member is disposed in the first receiving groove. Thus, the stylus can be received by the first receiving groove and the second receiving groove, and the stylus is also retained by the retaining member such that the stylus doesn't easily drops. Therefore, the stylus is retained without forming additional fixing plate. The material cost of the fixing plate is saved. In addition, the first receiving groove, the second receiving groove, and the retaining member can be simultaneously formed in one process (e.g., an injection molding process). The fabricating process is simplified and the fabrication cost is reduced.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
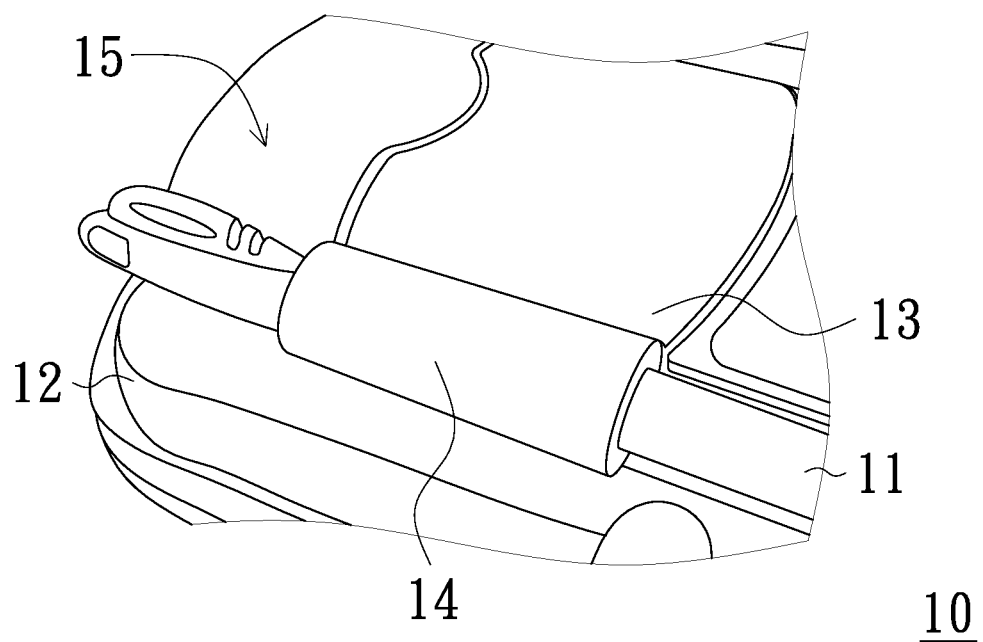
FIG. 1 is a schematic view of a conventional portable electronic device having a stylus.
Figure 2:
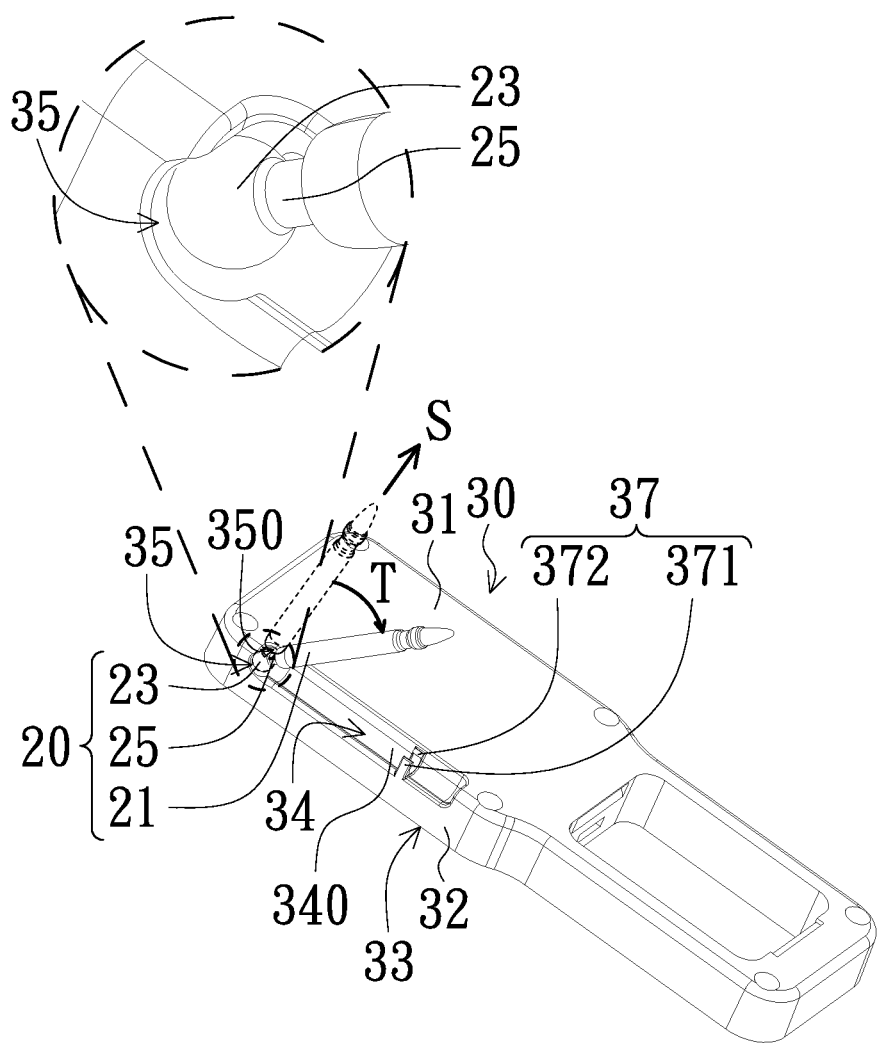
FIG. 2 is a schematic view of a composite stylus retaining structure for an electronic device in accordance with one embodiment.

FIG. 2 is a schematic view of a composite stylus retaining structure 100 for an electronic device in accordance with one embodiment. Referring to FIG. 2, the composite stylus retaining structure 100 includes a stylus 20 and a housing 30. The composite stylus retaining structure 100 can be used in portable electronic devices. The housing 30, for example, is a housing of a portable electronic device, and may include a display surface 33. The display surface 33, for example, is also a surface of touch panel, and the stylus can be used to touch the display surface 33. However, the above mentioned applications of the composite stylus retaining structure 100 is just taken as an example, and the present embodiment is not limited to only be used in portable electronic devices that have display surfaces. For example, the composite stylus retaining structure 100 can also be used in electronic drawing tablets or other non-electronic devices.

The stylus 20 includes a body 21, a head 23, and a connecting rod 25. The connecting rod 25 is connected between the body 21 and the head 23. In the present embodiment, the body 21 and the connecting rod 25 are substantially column shaped, and the head 23 is spherical. A diameter of the connecting rod 25 is less than that of the body 21 and the head 23. However, the present embodiment doesn't limit the shape of the body 21, the connecting rod 25 or the head 23.

Figure 3:
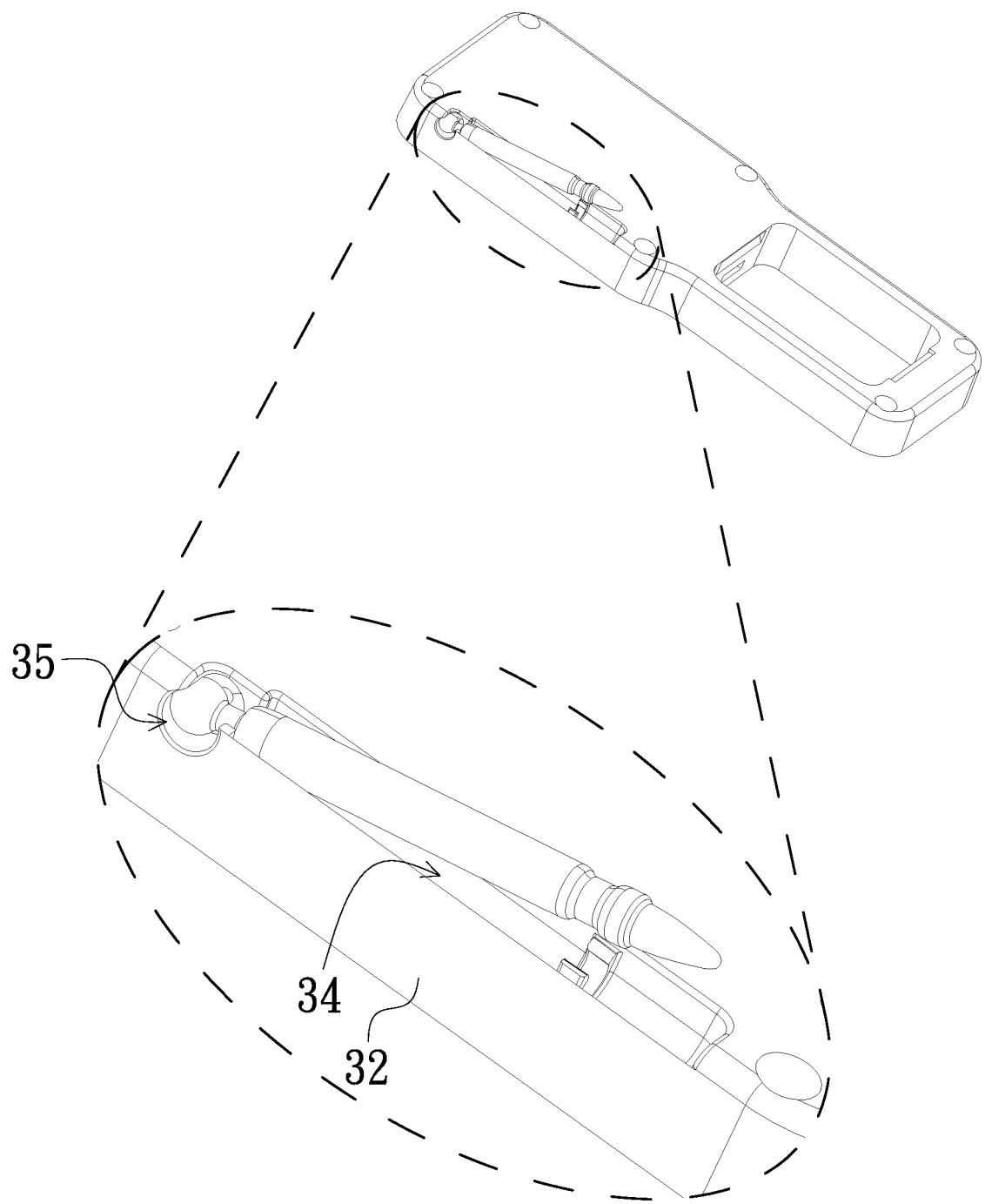
FIG. 3 is a schematic view of a stylus retaining structure for an electronic device in accordance with an another embodiment.

The housing 30 includes a first wall 31 and a second wall 32 connected with each other. The first wall 31, for example, is at a back side of the display surface 33. The second wall 32 is connected between the first wall 31 and the display surface 33. A first receiving groove 34 and a second receiving groove 35 are formed in the intersection (i.e., an edge of the housing 30) of the first wall 31 and the second wall 32. In the present embodiment, the first receiving groove 34 and the second receiving groove 35 are embedded in the first wall 31; the second receiving groove 35 is embedded in the second wall 32. To improve the convenience of taking out the stylus 20, the first receiving groove 34 can also be further embedded in the second wall 32. In another embodiment (as shown in FIG. 3), the first receiving groove 32 can also be only embedded in the first wall 31 but not in the second wall 32.

Referring again to FIG. 2, the first receiving groove 34 is used to receive the body 21 of the stylus 20, and a retaining member 37 is disposed in the first receiving groove 34. The retaining member 37 of the present embodiment, for example, includes at least one clamping arms 371 close to the second wall 32 (i.e. substantially in the outer surface of the second wall 32). In addition, the retaining member 37 may further includes a clamping arm 372 that is opposite to the clamping arm 371. The clamping arms 371, 372 are used to retain the body 21. Also, the retaining member 37 can be replaced with any other appropriate clamping structures that can achieve the retaining of the body 21, and is not limited to the above example. Besides, the number of the clamping member 37, and also the number of the clamping arms in each claiming member 37 may be more than one.

The second receiving groove 35 is used to receive the head 23 of the stylus 20. The second receiving groove 35, for example, has a cavity 350 that is covered by a portion of the first wall 31. In other words, the first wall 31 extends to cover a portion of the accommodating space (i.e., the cavity 350). If not used, the stylus 20 can be received in the accommodating space of the housing 30 including the first receiving groove 34 and the second receiving grove 35. In detail, during a receiving procedure of the stylus 20, the head 23 is set in the second receiving groove 35, and then is moved along a direction perpendicular to the second wall 32, as indicated by an arrow S in FIG. 2, until the head 23 is received in the second receiving groove 35. The shape of head 23 is conformable to the second receiving groove 35, for example, is spherical.

Figure 4:
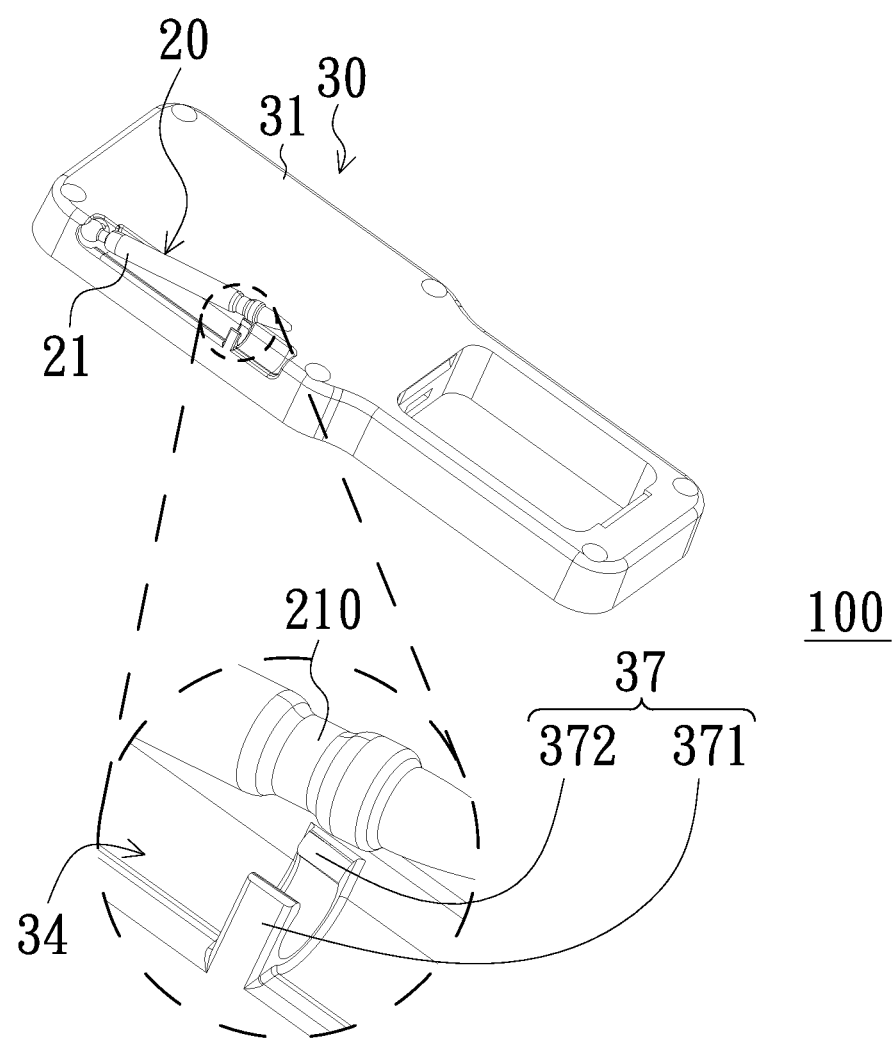
FIG. 4 is a schematic view illustrating a stylus in FIG. 2 is rotated such that a neck thereof is clamped by a retaining member.

After the head 23 is set in the second receiving groove 35, the body 21 can be rotated along a direction as indicated by an arrow T until the body 21 is set in the first receiving groove 34. In addition, as shown in FIG. 4, the body 21 may include a neck 210. During the settling of the body 21, the neck 210 of the body 21 is disposed between the clamping arms 371 and 372. As such, the body 21 is retained by the retaining member 37. In another embodiment, the body 21 doesn't include the neck 210. In such circumstance, the material and/or the shape of the clamping arms 371, 372 can be designed to provide adequate clamping force for the body 21.

Figure 5:
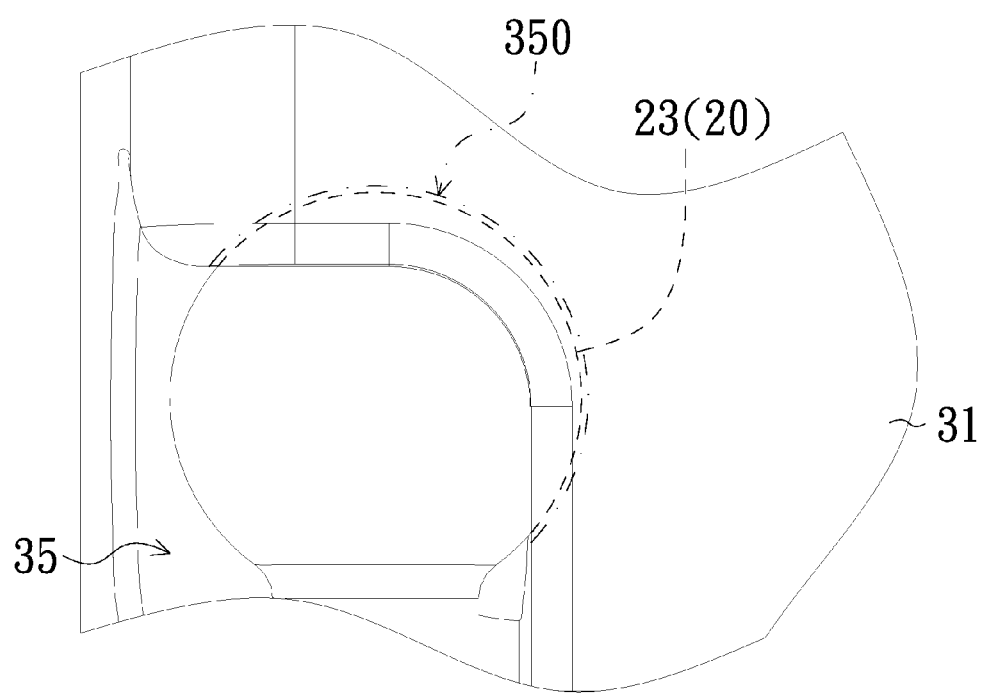
FIG. 5 is a schematic view illustrating a head of a stylus in FIG. 2 is received in a second receiving groove.

Referring to FIG. 5, as described above, the second receiving groove 35 includes the cavity 350 that is partial covered by the first wall 31; thus, when the stylus 20 is received in the housing 30, a portion of the head 23 is received in the cavity 350 and is also covered by the first wall 31. Accordingly, the movement of the head 23 towards the first wall 31 is restricted, and thus the head 23 doesn't drop off from the first wall 31.

In the present embodiment, the first receiving groove 34 and the second receiving groove 35 are formed on or within the housing 30, and the retaining member 37 is disposed in the first receiving groove 34. Thus, the stylus 20 can be received by the first receiving groove 34 and the second receiving groove 35, and retained by the retaining member 37 such that the stylus doesn't easily drops off. Therefore, the stylus 20 is retained without forming additional fixing plate. The material cost of the fixing plate is saved. In addition, the first receiving groove 34, the second receiving groove 35, and the retaining member 37 can be simultaneously formed in one process (e.g., an injection molding process). The fabricating process is simplified and the fabrication cost is reduced.

It is to be noted that the cavity 350 of the second receiving grove 35 can also be omitted in other embodiments. In such circumstance, to achieve the object of that the stylus 20 doesn't drop off from the second receiving groove 34, the position and the number of clamping member 37 can be adjusted.

Figure 6:
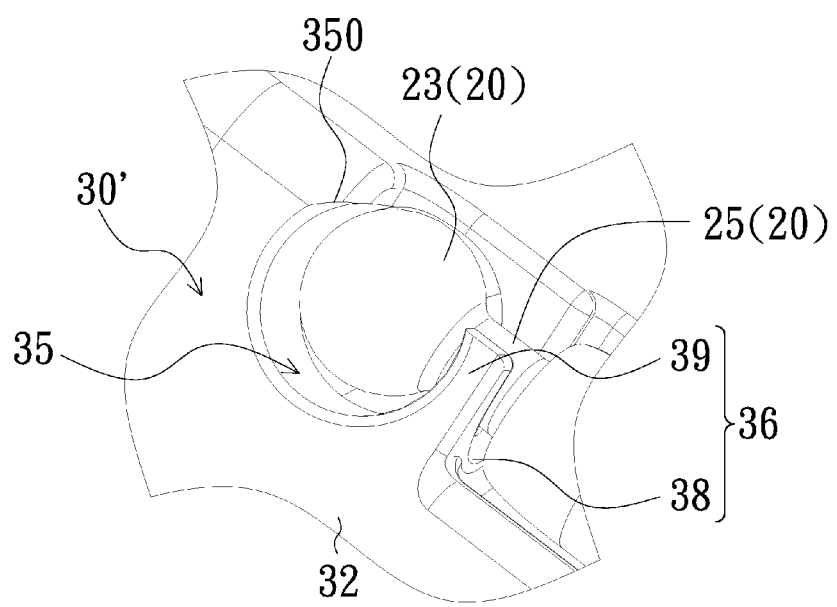
FIG. 6 is a partial schematic view of a stylus retaining structure for an electronic device in accordance with an another embodiment.

FIG. 6 is a partial schematic view of a composite stylus retaining structure for an electronic device in accordance with another embodiment. Referring to FIG. 6, the composite stylus retaining structure of the present embodiment is similar to the composite stylus retaining structure 100, except that the housing 30' further includes a supporter 36 disposed between the first receiving groove 34 and the second receiving grove 35. The supporter 36 is used to provide supporting and/or position limiting ability. Optionally, the supporter 36 may include a bearing portion 38. When the stylus 20 is received in the accommodating space of the housing 30', the bearing portion 38 supports the connecting rod 25 of the stylus 20. In addition, the supporter 36 may further include a stop block 39 disposed at a position corresponding to (i.e., aligned with) the connecting rod 25. The bearing portion 38, for example, is connected with the stop block 39. The stop block 39 is close to the second wall 32 (i.e. substantially in the outer surface of the second wall 32). The stop block 39 enhance the position limiting ability, and prevent the head 23 of the stylus 20 to slide out of the second receiving groove 35. During a practical application, the stop block 39 and the housing 30' can be formed into unitary piece with one molding process. The bearing portion 38 is optionally formed together with the stop block 39.

In other embodiments, the supporter 36 may only include one of the bearing portion 38 and the stop block 39. In addition, the supporter 36 shown in FIG. 6 is only taken for an example, and the present embodiment doesn't limit the practical structure of the supporter 36.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A composite stylus retaining structure in an electronic device, comprising:
   a stylus, comprising a body, a head, and a connecting rod connected between the body and the head, a diameter of the connecting rod being less than that of the body and the head;
   a housing, comprising a first wall and a second wall connected with each other, a first receiving groove and a second receiving groove being formed at an intersection of the first wall and the second wall, and a retaining member being disposed in the first receiving groove for retaining the stylus, wherein the first receiving groove is configured to receive the body, the second receiving groove is configured to receive the head, and the second receiving groove comprises a cavity and a portion of the head is received in the cavity when the stylus is received in the housing.

2. The composite stylus retaining structure of claim 1, wherein the shape of the second receiving groove is conformable to the head.

3. The composite stylus retaining structure of claim 1, wherein the first receiving groove is embedded in the second wall.

4. The composite stylus retaining structure of claim 1, wherein the retaining member comprises at least one clamping arm.

5. The composite stylus retaining structure of claim 4, wherein the body further comprises a neck and the retaining member retains the neck when the stylus is received in the housing.

6. The composite stylus retaining structure of claim 1, wherein the housing is a housing of the electronic device, the electronic device comprises a touch panel, and the stylus is configured to touch the surface of the touch panel.

7. The composite stylus retaining structure of claim 1, wherein the housing further comprises a supporter disposed between the first receiving groove and the second receiving groove.

8. The composite stylus retaining structure of claim 7, wherein the supporter comprises a stop block disposed at a position corresponding to the connecting rod.

9. A composite stylus retaining structure in an electronic device, comprising:
   a stylus, comprising a body, a head, and a connecting rod connected between the body and the head, a diameter of the connecting rod being less than that of the body and the head;
   a housing, comprising a first wall and a second wall connected with each other, wherein an accommodating space is formed at an intersection of the first wall and the second wall, the accommodating space is configured to receive the stylus, and a retaining member is disposed in the accommodating space for retaining the stylus;
   the body further comprising a neck and the retaining member retains the neck when the stylus is received in the housing.

10. The composite stylus retaining structure of claim 9, wherein the second receiving groove comprises a cavity and a portion of the head is received in the cavity when the stylus is received in the housing.

11. The composite stylus retaining structure of claim 9, wherein the first receiving groove is exposed from a surface of the housing.

12. The composite stylus retaining structure of claim 9, wherein the retaining member comprises at least one clamping arm.

13. The composite stylus retaining structure of claim 9, wherein the housing further comprises a supporter disposed between the first receiving groove and the second receiving groove.

14. The composite stylus retaining structure of claim 13, wherein the supporter comprises a stop block disposed at a position corresponding to the connecting rod.

15. A composite stylus retaining structure in an electronic device, comprising: a stylus, comprising a body, a head, and a connecting rod connected between the body and the head, a diameter of the connecting rod being less than that of the body and the head;
   a housing, defining a first receiving groove and a second receiving groove therein, the first receiving groove accommodating the body therein, the second receiving groove accommodating the head therein, a retaining member being disposed in the first receiving groove for retaining the body, the housing further comprising a supporter disposed between the first receiving groove and the second receiving groove.

16. The composite stylus retaining structure of claim 15, wherein the second receiving groove comprises a cavity and a portion of the head is received in the cavity when the stylus is received in the housing.

17. The composite stylus retaining structure of claim 15, wherein the first receiving groove is exposed from a surface of the housing.

18. The composite stylus retaining structure of claim 15, wherein the retaining member comprises at least one clamping arm clamping the body.

19. The composite stylus retaining structure of claim 15, wherein the supporter comprises a stop block disposed at a position corresponding to the connecting rod.

* * * * *